United States Patent
Menon et al.

(10) Patent No.: US 12,452,955 B2
(45) Date of Patent: Oct. 21, 2025

(54) NON-SERVICE INITIATED EMERGENCY CALL DEVICE PARAMETERS

(71) Applicants: AT&T Intellectual Property I, L.P., Atlanta, GA (US); AT&T Mobility II LLC, Atlanta, GA (US)

(72) Inventors: Sreejith Menon, Herndon, VA (US); Suja John, Herndon, VA (US)

(*) Notice: Subject to any disclaimer, the term of this patent is extended or adjusted under 35 U.S.C. 154(b) by 410 days.

(21) Appl. No.: 17/806,825

(22) Filed: Jun. 14, 2022

(65) Prior Publication Data

US 2023/0403761 A1   Dec. 14, 2023

(51) Int. Cl.
| | |
|---|---|
| *H04W 76/50* | (2018.01) |
| *G08B 25/00* | (2006.01) |
| *H04W 4/029* | (2018.01) |
| *H04W 4/90* | (2018.01) |
| *H04W 76/18* | (2018.01) |

(52) U.S. Cl.
CPC .......... *H04W 76/50* (2018.02); *G08B 25/004* (2013.01); *H04W 4/029* (2018.02); *H04W 4/90* (2018.02); *H04W 76/18* (2018.02)

(58) Field of Classification Search
CPC ....... H04W 76/50; H04W 4/029; H04W 4/90; H04W 76/18; G08B 25/004; G08B 25/016
See application file for complete search history.

(56) References Cited

U.S. PATENT DOCUMENTS

| | | | | |
|---|---|---|---|---|
| 2005/0287979 | A1* | 12/2005 | Rollender | ............ H04M 3/5116 |
| | | | | 455/404.1 |
| 2010/0087160 | A1* | 4/2010 | Snapp | .................... H04W 76/50 |
| | | | | 455/404.1 |
| 2015/0140946 | A1* | 5/2015 | Hursey | .................. H04M 11/04 |
| | | | | 455/404.1 |
| 2019/0394814 | A1* | 12/2019 | Bakker | ............... H04L 65/1016 |

FOREIGN PATENT DOCUMENTS

CA         2617783 C   *   7/2012   ............. G08B 25/10

OTHER PUBLICATIONS

"Universal Mobile Telecommunications System (UMTS); IP Multimedia Subsystem (IMS) emergency sessions," 3GPP TS 23.167 version 7.7.0 Release 7, Jan. 2008, 34 pages.

* cited by examiner

*Primary Examiner* — Umair Ahsan
(74) *Attorney, Agent, or Firm* — Erik Boyd

(57) ABSTRACT

Respective implementations facilitating non-service initiated (NSI) 911 device parameters are provided. A method can include detecting, by a system comprising a processor, an initialization of an emergency call by the system, the emergency call using a first communication network that is distinct from any second communication networks that the system is registered to use; generating, by the system in response to the detecting, a non-service initiated parameter message comprising data indicative of a location of the system; and initiating, by the system, the emergency call using the first communication network, the initiating com- (Continued)

prising transmitting the non-service initiated parameter message to network equipment of the first communication network.

20 Claims, 12 Drawing Sheets

NON-SERVICE INITIATED EMERGENCY CALL DEVICE PARAMETERS

TECHNICAL FIELD

The present disclosure relates to wireless communication networks, and, in particular, to techniques for facilitating non-service initiated emergency calls in a wireless communication network.

BACKGROUND

A non-service initiated (NSI) emergency call is a call that is made from a device that has no service agreement with any network operators or service providers present in the area of the device. In general, a device initiates an NSI emergency call in the event that either (1) the device lacks an active subscriber information module (SIM), or (2) the device has an active SIM but does not have coverage with its home service provider or any other providers with which the home service provider has roaming agreements. Because NSI calls do not go through an emergency calling registration process, they can be routed to a public safety answering point (PSAP) without a callback number and/or other details associated with the calling party.

DETAILED DESCRIPTION

Various specific details of the disclosed embodiments are provided in the description below. One skilled in the art will recognize, however, that the techniques described herein can in some cases be practiced without one or more of the specific details, or with other methods, components, materials, etc. In other instances, well-known structures, materials, or operations are not shown or described in detail to avoid obscuring certain aspects.

In an aspect, a method as described herein can include detecting, by a system including a processor, an initialization of an emergency call by the system, where the emergency call uses a first communication network that is distinct from any second communication networks that the system is registered to use. The method can further include generating, by the system in response to the detecting, a non-service initiated parameter message including data indicative of a location of the system. The method can also include initiating, by the system, the emergency call using the first communication network, where the initiating includes transmitting the non-service initiated parameter message to network equipment of the first communication network.

In another aspect, a system as described herein can include a processor and a memory that stores executable instructions that, when executed by the processor, facilitate performance of operations. The operations can include processing an initialization of an emergency call using resources enabled via a first communication network that is distinct from any second communication networks with which the system is registered; in response to the processing, generating an NSI data message, the NSI data message including location data associated with a position of the system; and initiating the emergency call via the first communication network, where the initiating includes transmitting the NSI data message to network equipment of the first communication network.

In a further aspect, a non-transitory machine-readable medium as described herein can include executable instructions that, when executed by a processor, facilitate performance of operations. The operations can include detecting a request for an NSI emergency call, the NSI emergency call using resources associated with a first communication network that is distinct from any second communication networks to which the network equipment is registered; in response to the processing, generating an NSI parameter message, the NSI parameter message comprising data associated with a location of the network equipment; and initiating the NSI emergency call with the first communication network, including transmitting the NSI parameter message to radio access network equipment of the first communication network.

Figure 1:
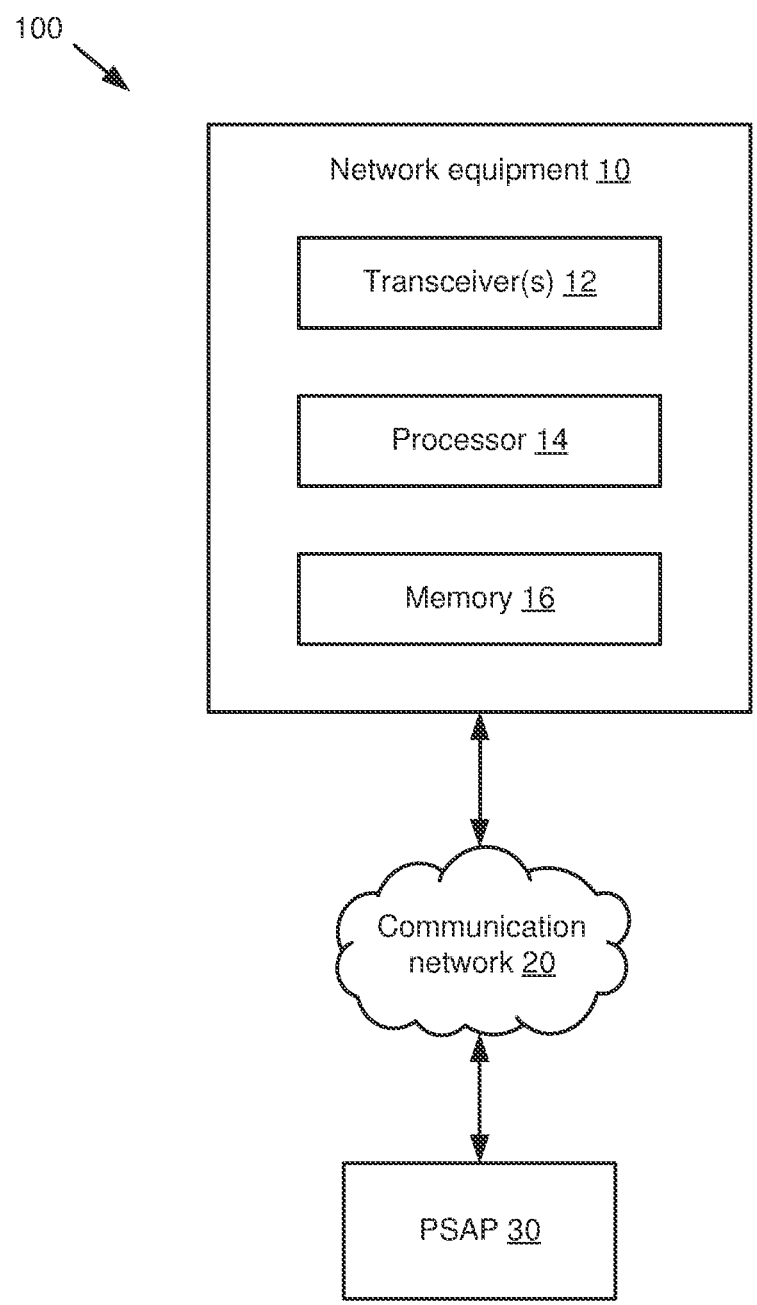
FIG. 1 is a block diagram of a system that facilitates non-service initiated (NSI) emergency call device parameters in accordance with various aspects described herein.

Referring first to FIG. 1, a system 100 that facilitates NSI emergency call device parameters is illustrated. System 100 as shown by FIG. 1 includes network equipment that can engage in communication using resources associated with a communication network 20. The network equipment 10, which can also be referred to as user equipment (UE), network devices, or the like, can be and/or include any devices that are capable of communication over one or more communication networks, e.g., the communication network Examples of devices that can implement the functionality of the network equipment 10 can include, but are not limited to, smartphones or other mobile phones, laptop or tablet computers, vehicle communication systems (e.g., vehicle-to-everything (V2X) communication systems, etc.) associated with an autonomous or manually operated vehicle, Internet of Things (IoT) devices, and/or any other device suitable for communicating using resources enabled via the communication network 20. While only one network equipment 10 is shown in system 100 for simplicity of illustration, it is noted that the communication network 20 could provide communication service for any suitable number of network equipment 10 and/or other devices.

The communication network 20 shown in system 100 can be a network operating according to any suitable wireless communication technology, such as a cellular network (e.g., a Fourth Generation (4G) Long Term Evolution (LTE) network, a Fifth Generation (5G) New Radio (NR) network, etc.), a Wireless Fidelity (Wi-Fi) network, a BLUETOOTH® network, and/or any other suitable network technology, either presently existing or developed in the future. While various examples provided herein relate to implementations in which the communication network 20 is a cellular network, it is noted that other network types could also be utilized.

In an implementation, the communication network 20 shown in system 100 can include radio access network (RAN) equipment, such as Evolved Node Bs (eNBs), Next Generation Node Bs (gNBs), and/or other access points or other equipment that facilitates communication between the network equipment 10 and the communication network 20. Additionally, the communication network 20 can include core network equipment, which can implement various network functions and/or perform other operations associated with providing communication service within the communication network 20.

In the event that the network equipment 10 initiates an emergency session (e.g., to place an emergency call via 911 or another designated telephone number), the emergency session can be routed by the communication network 20 to a public safety answering point (PSAP) 30 that can dispatch police, fire, medical, and/or other emergency services within an area associated with the PSAP 30. If the network equipment 10 has an active subscriber account associated with a network operator (e.g., as indicated by a subscriber information module (SIM) coupled to the device), the network equipment 10 can attempt to attach to a communication network 20 associated with that network operator, which is referred to herein as a home network. If attachment to a home network is successful, an emergency session as described above can be routed through core network equipment of the home network, which can in turn determine an approximate location of the network equipment 10 and route the emergency session, along with information associated with the subscriber account for the network equipment, to a PSAP 30 associated with that location. This procedure is described in further detail below with respect to FIG. 3. Similarly, if home network coverage is not available at the location of the network equipment 10 but coverage to another communication network 20 with which the home network has a roaming agreement (referred to herein as a roam or roaming network), the home and roaming networks can facilitate routing of an emergency session to an appropriate PSAP 30 as described in further detail below with respect to FIG. 4.

In contrast, in the event that the network equipment 10 either lacks an active subscriber account or is in a location with no available coverage from a home or roaming network, the network equipment can initiate an emergency session via any communication network 20 that provides communication service in the location of the network equipment 10 regardless of subscription status. As such an emergency session does not utilize any networks that are registered at the network equipment to provide service to the network equipment 10, such an emergency session is referred to as a non-service initiated (NSI) emergency session. An example NSI emergency session is described in further detail below with respect to FIG. 5.

Unlike the case in which an emergency session is routed through a home or roaming network, the communication network 20 through which an NSI session is routed does not have access to any information relating to the network equipment 10 or its location. As a result, NSI emergency sessions can be routed to an arbitrary PSAP 30 without further input from the network equipment 10, such that a dispatcher or other human operator at the PSAP 30 is tasked with obtaining location and/or other information associated with the network equipment 10 manually. This manual intervention can be an error-prone process and can lead to details not being captured correctly, e.g., in cases of poor cellular reception or the like, which can in turn lead to slower emergency response times and poorer outcomes. Moreover, because NSI calls are not routed to a PSAP 30 with any accompanying information, PSAPs 30 are vulnerable to denial of service-like attacks in which a PSAP 30 is inundated with large numbers of false calls. As new cellular technologies are developed, older technologies sunset, and newer operators enter the cellular operator space, these challenges are expected to increase in the future.

To the foregoing and/or related ends, the network equipment 10 shown in FIG. 1 can produce and transmit an intelligent device-based message that can provide relevant details to a PSAP 30 natively even in the case of an NSI emergency call. For instance, NSI 911 calls can be routed to a PSAP 30 with subscriber and location information, thereby aiding the PSAP 30 and its operators to properly identify users, separate malicious callers from genuine callers, and more efficiently respond to emergency incidents.

As further shown in FIG. 1, the network equipment 10 of system 100 can include one or more transceivers 12 as well as a processor 14 and a memory 16, which can be utilized to facilitate various functions of the network equipment 10. For instance, the transceiver(s) 12 can include antennas, decoders, modulators, and/or other components associated with communicating data between the network equipment 10 and the communication network 20. Additionally, the memory 16 can include a non-transitory computer readable medium that contains computer executable instructions, and the processor 14 can execute instructions stored by the memory 16. For simplicity of explanation, various actions that can be performed via the processor 14 and the memory 146 of the network equipment 10 are shown and described below with respect to various logical components. In an aspect, the components described herein can be implemented in hardware, software, and/or a combination of hardware and software. For instance, a logical component as described herein can be implemented via instructions stored on the memory 16 and executed by the processor 14. Other implementations of various logical components could also be used, as will be described in further detail where applicable.

Figure 2:
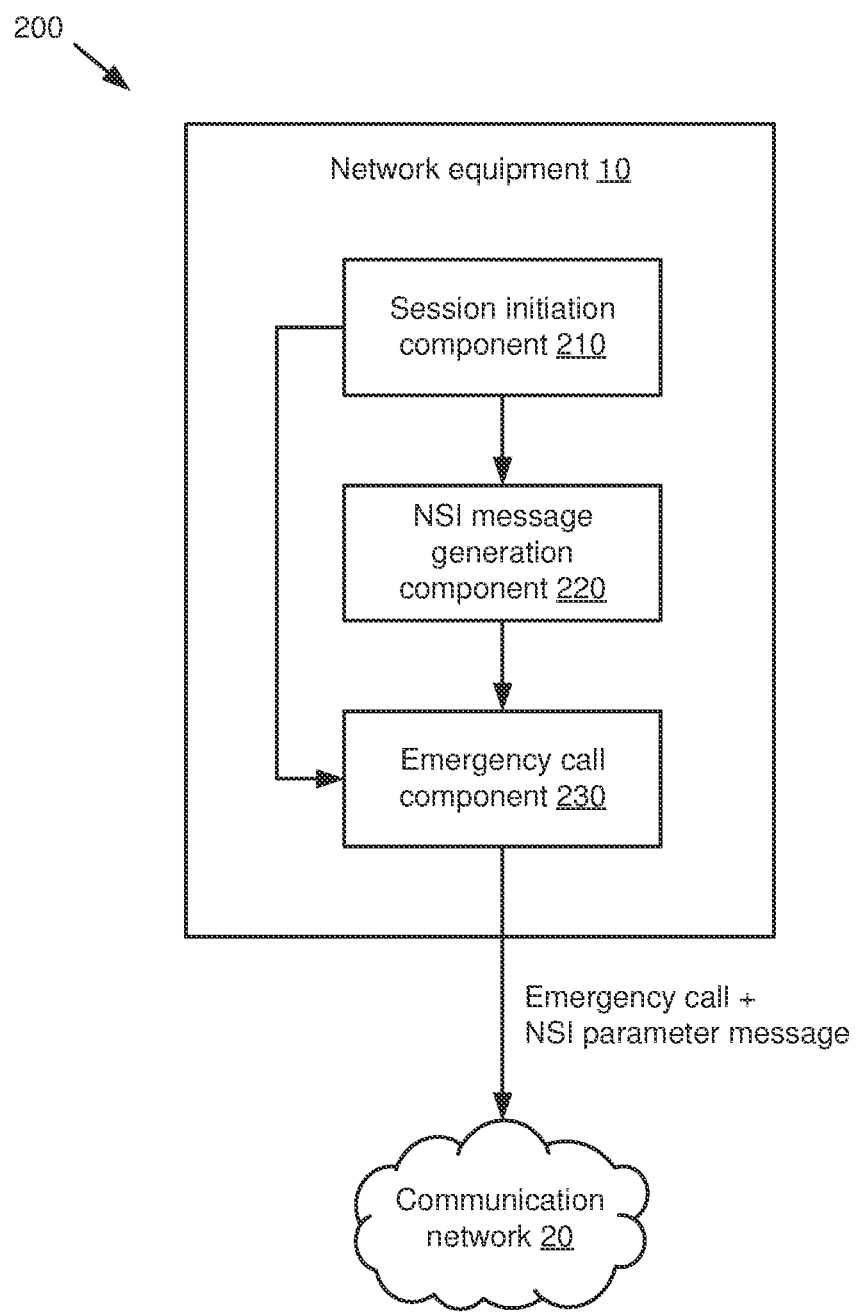
FIG. 2 is a block diagram that depicts the functionality of the network equipment of FIG. 1 in further detail in accordance with various aspects described herein.

With reference now to FIG. 2, a block diagram of a system 200 that facilitates NSI emergency call device parameters is illustrated. Repetitive description of like elements employed in other embodiments described herein is omitted for brevity. System 200 as shown in FIG. 2 includes network equipment 10 that can operate in a similar manner to that described above with respect to FIG. 1. As further shown in FIG. 2, the network equipment includes a session initiation component 210 that can process or otherwise detect an initialization of an emergency call. An initialization of an emergency call as processed by the session initiation component 210 can take the form of a request for an emergency call or session originating from the network equipment 10 and/or any other suitable event that triggers an activation of an emergency call or session.

In an embodiment, the network equipment 10 can be registered to use respective communication networks (e.g., home and/or roaming networks as described above with respect to FIG. 1), and the session initiation component 210 can further determine that an emergency call is an NSI call, e.g., based on the emergency call using a communication network 20 that is distinct from any of the communication networks to which the network equipment 10 is registered. In one implementation, the session initiation component 210 can identify an NSI emergency call based, at least in part, on the absence of coverage associated with a registered home or roaming network, as will be described in further detail below with respect to FIG. 6.

The network equipment 10 of system 200 further includes an NSI message generation component 220, which, in response to the session initiation component 210 detecting and/or otherwise processing an NSI emergency call, can generate an NSI parameter message that includes data associated with the network equipment 10. Information that can be included in the NSI parameter message can relate to, for example, a current location of the network equipment 10, a registered subscriber address associated with the network equipment and/or its user(s), a Mobile Station Integrated Services Digital Network (MSISDN) or callback number associated with the network equipment 10, and/or any other information that could be used by a PSAP in responding to an emergency call. Various examples of techniques by which information can be gathered and included in the NSI parameter message are described in further detail below with respect to FIGS. 7-9.

The network equipment 10 of system 200 additionally includes an emergency call component 230 that can initiate an NSI emergency call with a given communication network 20 via a process that includes transmitting the NSI parameter message generated by the NSI message generation component 220 to RAN equipment, or other suitable network equipment, of the communication network 20. The communication network 20 can then route the emergency call to an appropriate PSAP 30 (not shown in FIG. 2) near the location of the network equipment 10 with the NSI parameter message, which in turn can enable the PSAP to handle the NSI emergency call with reduced manual intervention.

By generating and transmitting an NSI parameter message as shown in FIG. 2, information relating to network equipment 10 can be made available from the network equipment 10 directly to a PSAP 30, even in scenarios in which the network equipment 10 lacks home network coverage. Additionally, information included in the NSI parameter message can be automatically populated in the dispatch system and/or other tools used within a PSAP, which can enable PSAP agents to handle emergency calls more efficiently. Use of an NSI parameter message as described herein can additionally enable malicious emergency calls to be identified more seamlessly, which can enable a PSAP to focus additional time and resources on actual incidents.

As noted above, NSI 911 calling can present significant challenges for a mobile network operator, e.g., due to NSI 911 calls, when routed to a PSAP, not containing information such as subscriber name, address, callback number, location, and/or other information associated with the calling party. NSI 911 calls are conventionally routed without this information for the reason that, although a device performing a NSI 911 call can contact emergency services via any operator coverage that exists in the area from which the call is being made, the device does not go through the usual emergency calling registration process, e.g., due to the device lacking a SIM and/or any coverage through a home service provider or a roaming partner provider.

Figure 3:
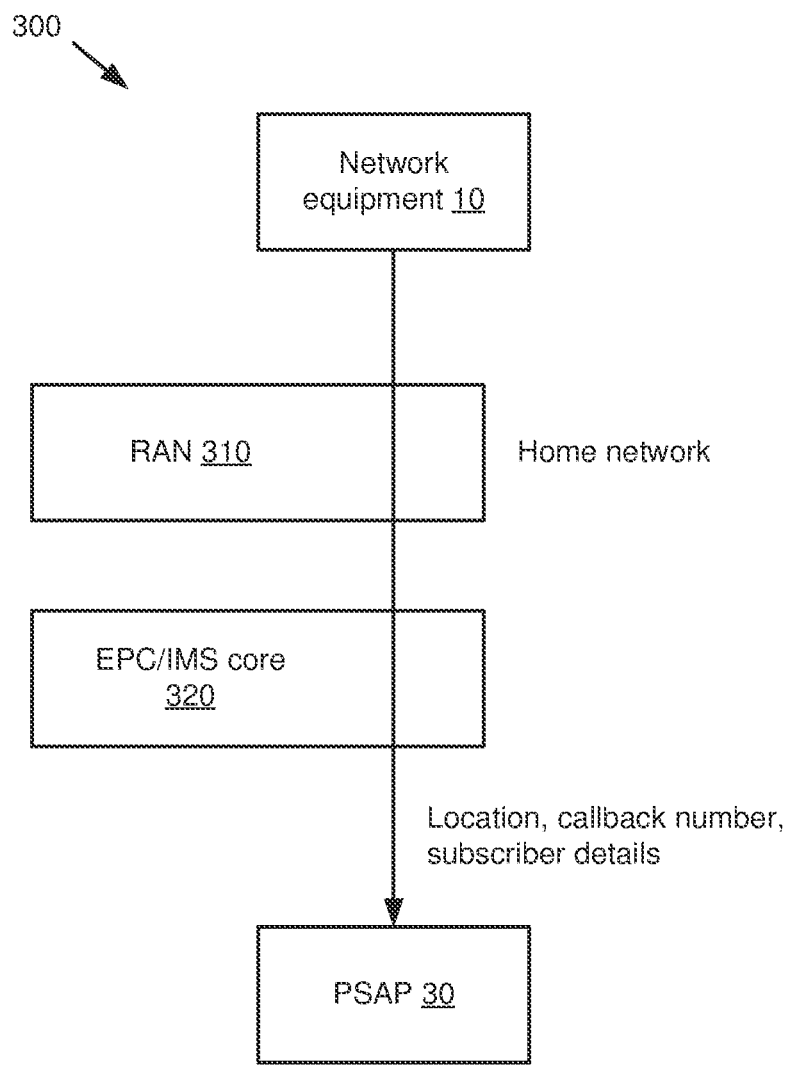
FIGS. 3-5 are diagrams depicting respective example network communication paths that can be utilized for an emergency call in accordance with various aspects described herein.

To better illustrate these challenges, diagram 300 in FIG. 3 illustrates an example emergency calling procedure in which network equipment 10 conducts an emergency call over its home network. In the example shown by diagram 300, the network equipment 10 is in the coverage area of its home network, where it is served by a RAN 310 and an Evolved Packet Core (EPC)/IP (Internet Protocol) Multimedia Subsystem (IMS) core 320 associated with the home network. In this scenario, when the network equipment 10 initializes an emergency call, the EPC/IMS core 320 has all of the subscriber information regarding, e.g., the location of the network equipment 10, the subscriber MSISDN and/or subscriber name associated with the network equipment 10, and/or other relevant information. Thus, when the call is routed to the PSAP 30, the PSAP 30 receives all such information from the home network operator.

Figure 4:
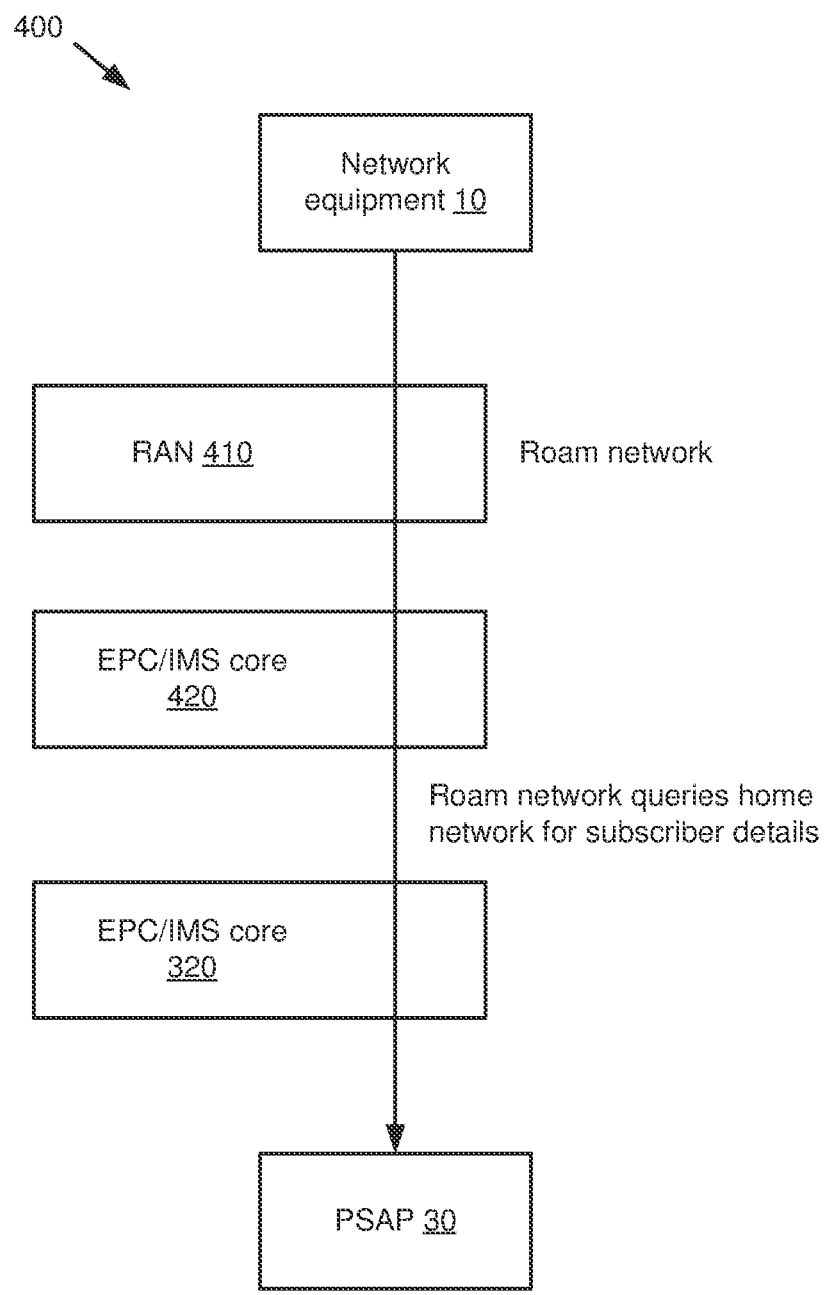

In another example as shown by diagram 400 in FIG. 4, the network equipment 10 is located in an area where its home network operator does not have coverage but instead has a roaming agreement with a second operator, such that the network equipment is served by a RAN 410 and an EPC/IMS core 420 of a roaming network that is associated with the second operator. In this example, when the network equipment 10 initializes an emergency call, the roaming EPC/IMS core 420 can submit a query to the EPC/IMS core 320 of the home network to obtain subscriber information related to the network equipment 10. Once the information is obtained by the roaming network, the roaming network can then route the call to the PSAP 30 with the obtained information in a similar manner to the example shown by diagram 300 in FIG. 3.

Figure 5:
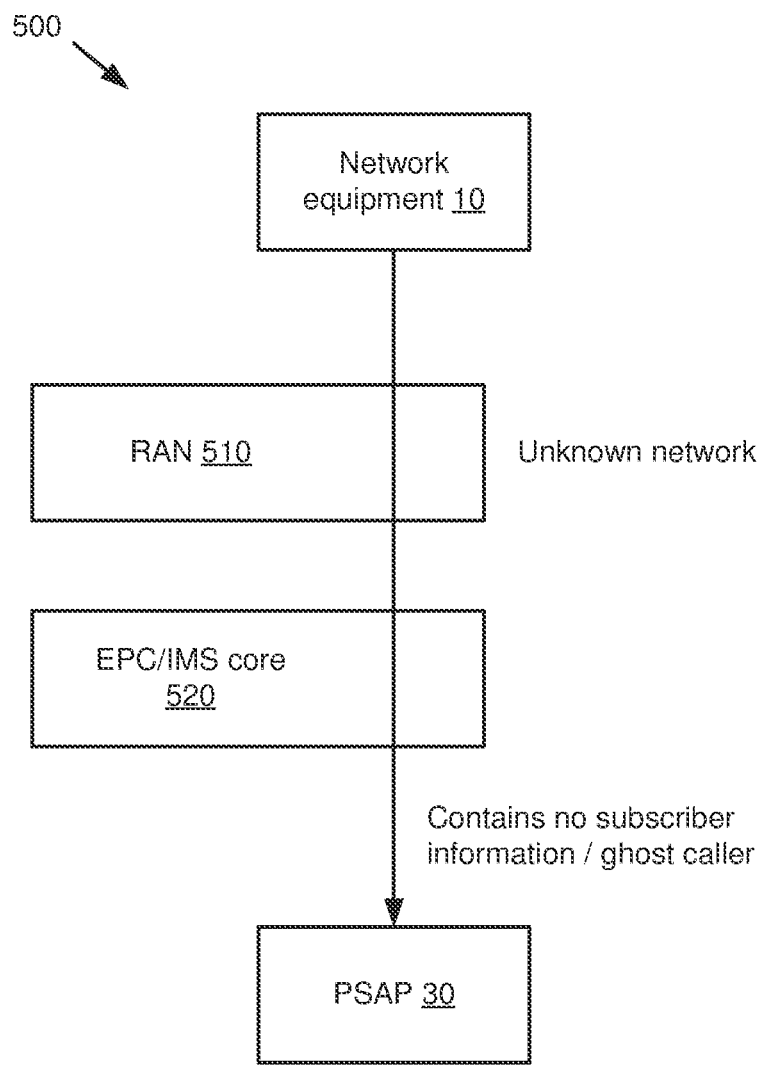

In contrast, diagram 500 in FIG. 5 illustrates an example in which the network equipment 10 does not have coverage with its home network, the roaming network shown in diagram 400 has shut down its network or moved to a new technology that is not compatible with the network equipment 10, and no other roaming partner coverage is available in the area. In this example, if the network equipment 10 initiates an emergency call, the network equipment 10 can select an available non-partner network in the area, e.g., based on signal strength and/or quality of the available networks in the area and/or based on other criteria. The EPC/IMS core 520 of the selected network can allow the call to be processed but will route the call to the PSAP 30 with no accompanying information. As noted above, this can result in a PSAP agent manually obtaining subscriber information from the calling party, which can be a time-consuming and error-prone process. Thus, by generating and transmitting an NSI parameter message such as that described above with respect to FIG. 2, key parameters such as location data, subscriber phone number or MSISDN, and/or other parameters can be automatically provided by the network equipment 10 to the PSAP 30 in the event of an NSI emergency call.

Figure 6:
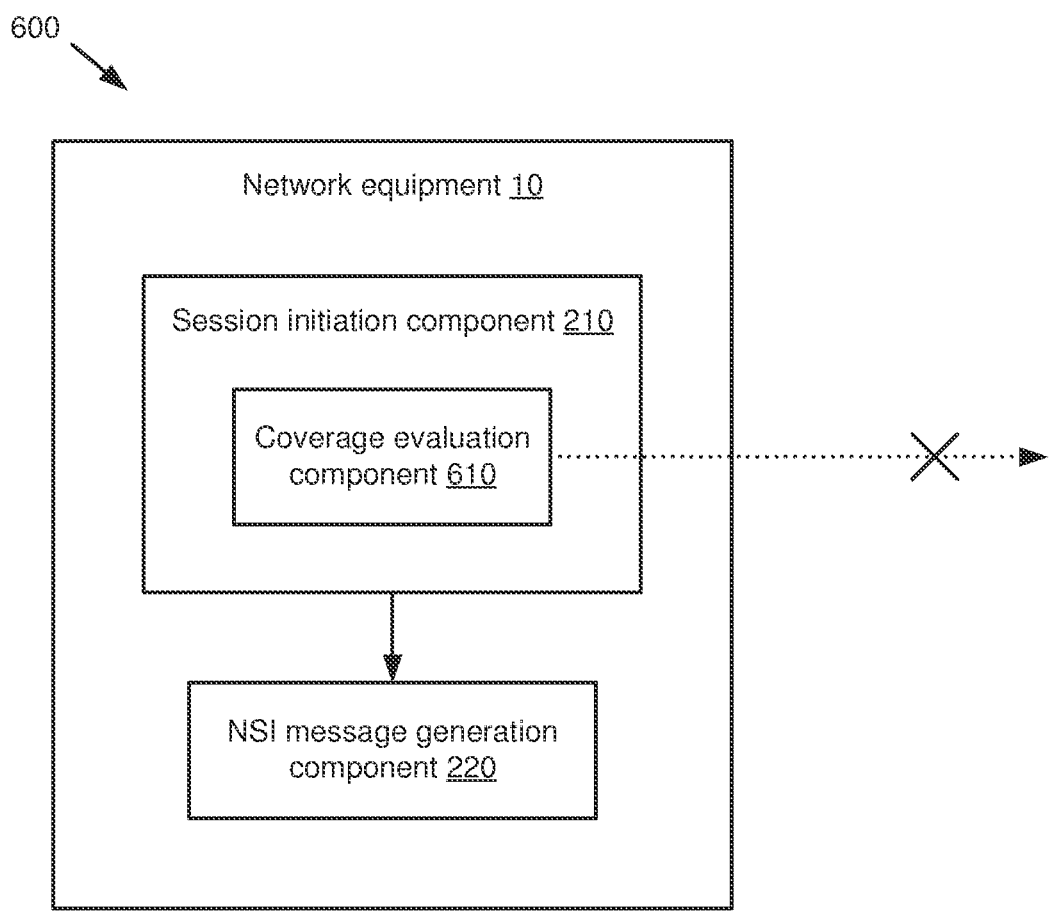
FIG. 6 is a block diagram of a system that facilitates network coverage evaluation in connection with an emergency call in accordance with various aspects described herein.

Referring next to FIG. 6, a block diagram of a system 600 that facilitates network coverage evaluation in connection with an emergency call is illustrated. Repetitive description of like elements employed in other embodiments described herein is omitted for brevity. System 600 as shown in FIG. 6 includes network equipment 10 with a session initiation component 210 and an NSI message generation component 220, which can function as described above, e.g., with respect to FIG. 2. As further shown in FIG. 6, the session initiation component 210 can include a coverage evaluation component 610, which can determine whether network coverage is available via any network operators associated with the network equipment 10, e.g., a home network operator for the network equipment 10 and/or any other network operators with which the home network operator has a roaming agreement. In response to determining that no home or roaming network coverage is available, the coverage evaluation component can trigger operation of the NSI message generation component 220 as described above.

In an aspect, the coverage evaluation component 610 can identify respective network operators for which the network equipment 10 has an active subscription, e.g., either as a home network operator or a roaming network operator, from subscriber information stored on a SIM and/or a universal integrated circuit card (UICC). The coverage evaluation component 610 can then determine whether the network equipment 10 is currently registered to one or more communication networks associated with an identified operator. Based on this determination, the coverage evaluation component 610 can trigger operation of the NSI message generation component 220, e.g., in the absence of registration of the network equipment 10 to said network(s).

Figure 7:
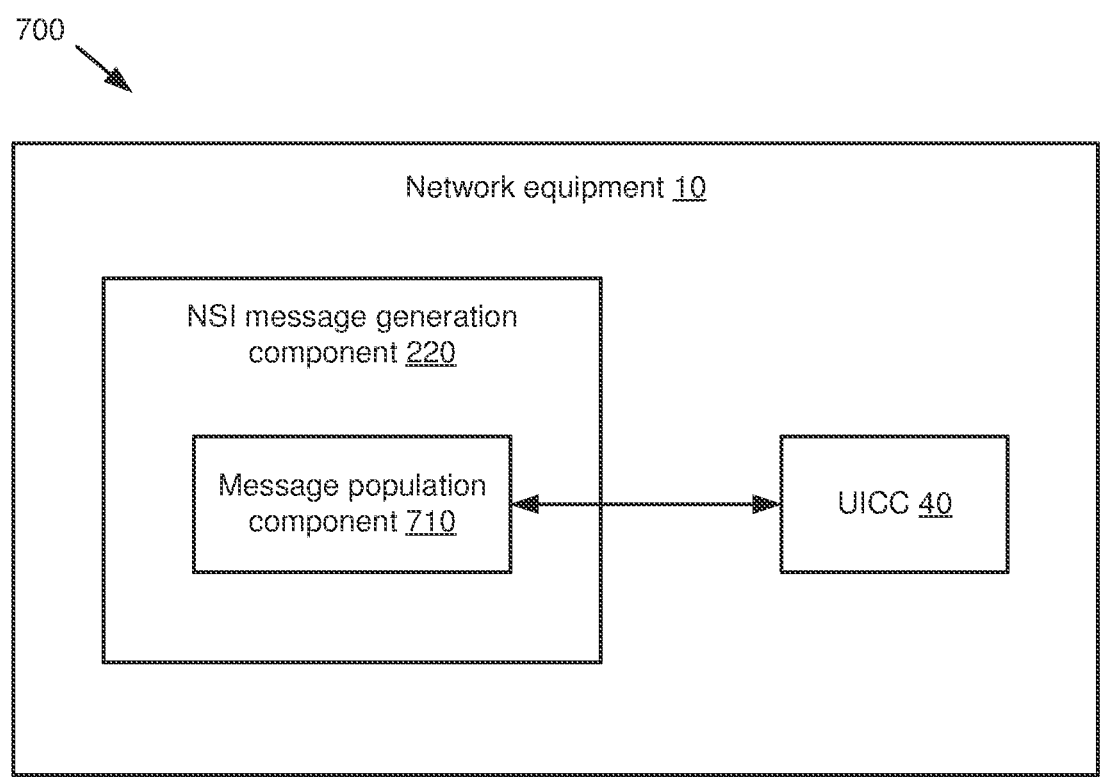
FIGS. 7-9 are block diagrams of respective systems that facilitate population of an NSI parameter message in accordance with various aspects described herein.
Figure 8:
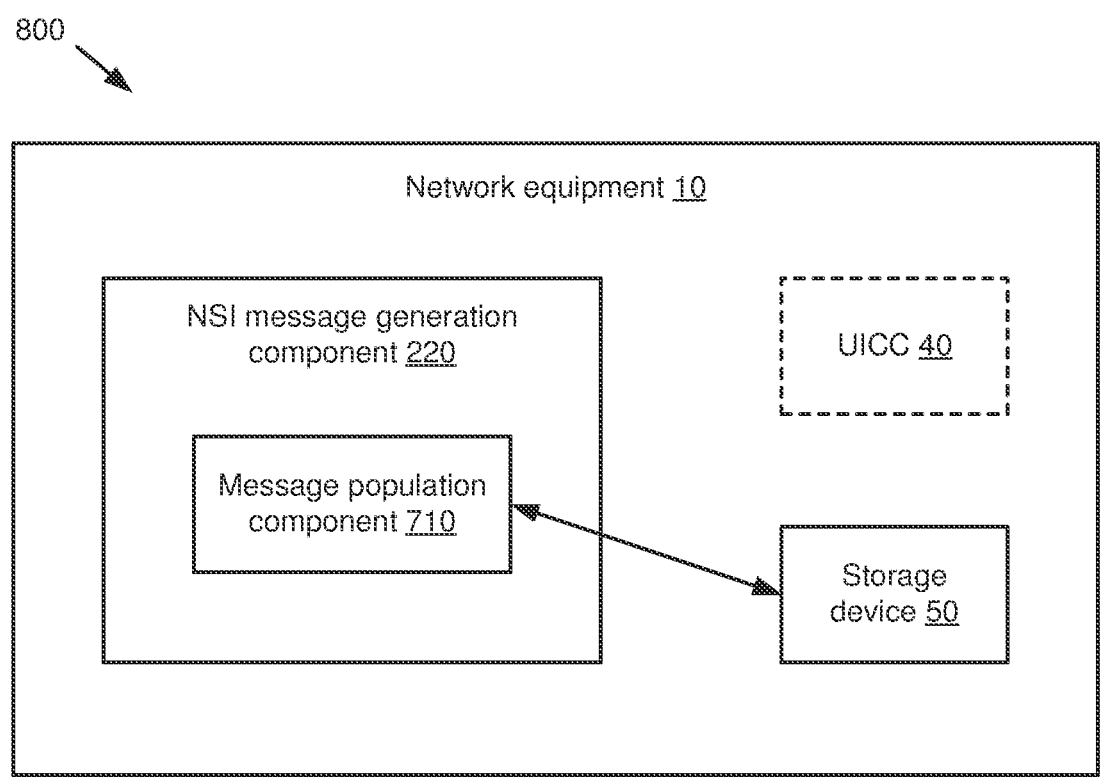

Turning now to FIG. 7, a block diagram of a system 700 that facilitates population of an NSI parameter message is illustrated. Repetitive description of like elements employed in other embodiments described herein is omitted for brevity. System 700 as shown in FIG. 7 includes a network equipment 10 with an NSI message generation component 220, which can operate as described above with respect to FIG. 2. As additionally shown in FIG. 7, the NSI message generation component 220 of the network equipment 10 can include a message population component 710, which can populate an NSI parameter message, and/or other messages generated by the NSI message generation component 220, with subscriber profile parameters associated with the network equipment 10.

As shown in FIG. 7, if a UICC 40 (e.g., a SIM or a device containing and/or implementing the functionality of a SIM) is coupled to and/or otherwise associated with the network equipment 10, the message population component 710 can retrieve subscriber profile parameters for the NSI parameters message from the UICC 40. In an aspect, the message population component 710 can retrieve subscriber parameters from a UICC 40 associated with the network equipment 10 even if the UICC 40 is not active and/or network coverage is not available from any network operators identified on the UICC 40.

Alternatively, if a UICC 40 is not present at and/or associated with the network equipment 10, the message population component 710 can attempt to obtain information for the NSI parameter message from other sources associated with the network equipment 10. For instance, as shown by system 800 in FIG. 8, in response to a UICC 40 being absent from the network equipment 10 (as shown by dashed outlining), the message population component 710 can obtain subscriber information and/or other data from a cache maintained on a storage device 50 associated with the network equipment 10. Thus, for example, in the event that a UICC 40 was previously associated with the network equipment the message population component 710 can retrieve the most recently cached MSISDN and/or other information from the previous UICC from the storage device 50. Alternatively, if a UICC 40 has never been associated with the network equipment 10, or the storage device does not have cached subscriber information corresponding to a previous UICC 40, the message population component 710 can omit respective parameters from the NSI parameter message for which no information is available.

Figure 9:
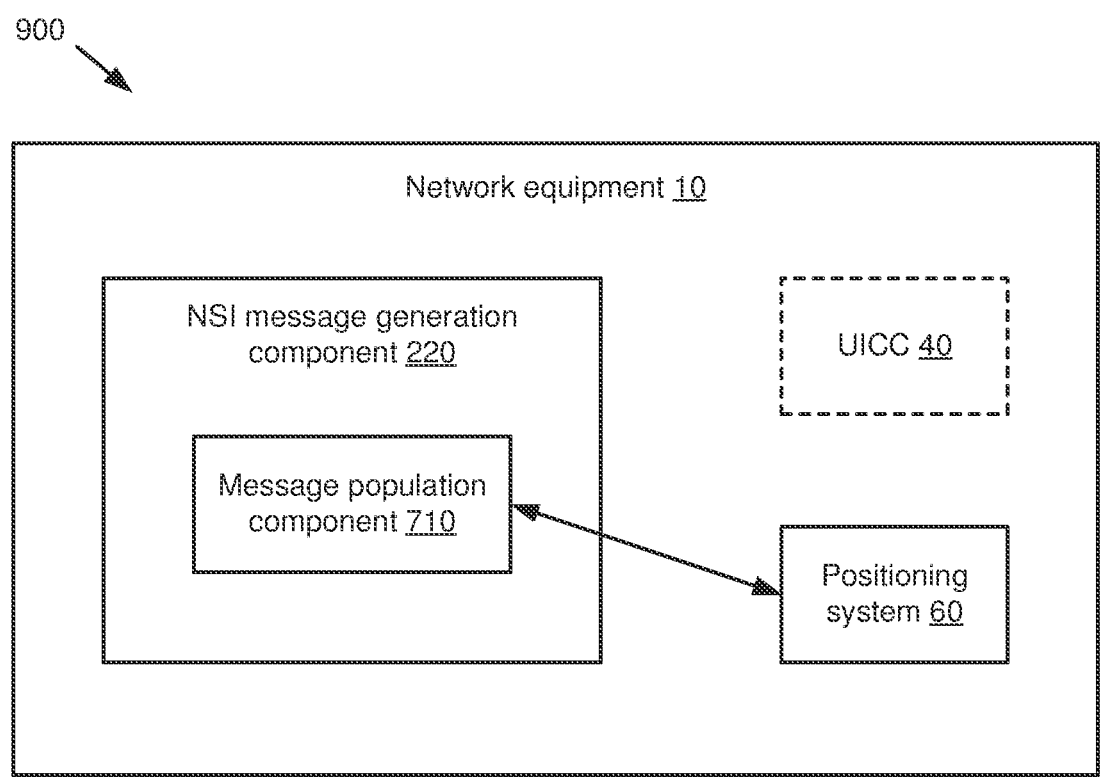

Similarly, as shown by system 900 in FIG. 9, the message population component 710 can obtain information relating to the location of the network equipment 10 from a positioning system 60 associated with the network equipment 10 in the absence of an active UICC 40. For instance, in response to determining that a UICC 40 is not associated with the network equipment 10, the message population component 710 can determine the location of the network equipment 10 via the positioning system 60 and include said location in the NSI parameter message. In various implementations, the positioning system 60 can include any hardware and/or software components, such as Global Positioning System (GPS) receivers, accelerometers, or the like, that are operable to determine an approximate location of the network equipment 10.

Figure 10:
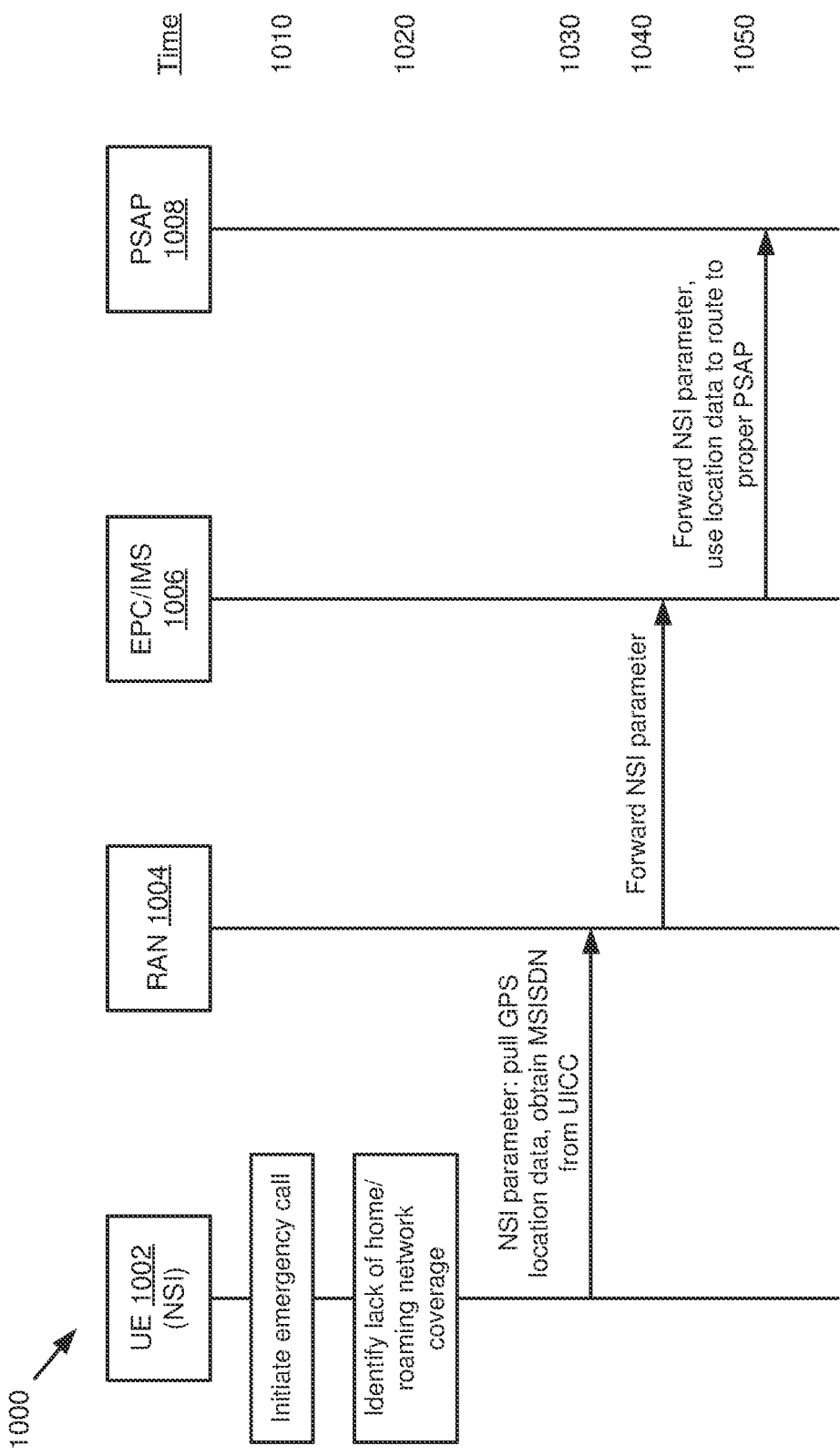
FIG. 10 is a messaging flow diagram depicting an example procedure for obtaining and transmitting NSI emergency call device parameters in accordance with various aspects described herein.

Referring next to FIG. 10, a messaging flow diagram 1000 depicting an example procedure for obtaining and transmitting NSI emergency call device parameters is illustrated. Repetitive description of like elements employed in other embodiments described herein is omitted for brevity. In particular, diagram 1000 illustrates example network operations that can be facilitated by a UE 1002 that initiates an NSI emergency call, a RAN 1004 and EPC/IMS 1006 associated with a network on which the NSI emergency call is placed, and a PSAP 1008 to which the NSI emergency call is routed. The operations shown in diagram 1000 begin at time 1010, in which a subscriber initiates an NSI emergency call from the UE 1002, e.g., from an area in which the UE 1002 does not have coverage from a home network. At time 1020, the UE 1002 can identify, e.g., during processing of the emergency call, that no home network coverage is present in the area of the UE 1002. Further at time 1020, the UE 1002 can determine, e.g., from a UICC (if present), that no roaming network coverage is present in the area of the UE 1002.

As a result of determining at time 1020 that no home or roaming network coverage is present at the UE 1002, the UE 1002 can process the emergency call as a NSI emergency call. Accordingly, at time 1030, the UE 1002 can trigger sending NSI parameters by obtaining and populating an NSI parameters message with relevant information. By way of example, the UE 1002 can pull in location data, e.g., from a GPS system or other positioning system associated with the UE 1002. Additionally, the UE 1002 can obtain a MSISDN associated with the UE 1002 from a UICC or SIM card associated with the UE 1002 if such a device is present. The UE 1002 can then send the NSI parameters across any existing network coverage available in the area of the UE 1002, here the RAN 1004.

At time 1040, the RAN 1004 can forward the NSI parameters received from the UE 1002 to core network equipment, e.g., the EPC/IMS 1006. At time 1050, the EPC/IMS 1006 can utilize an emergency calling function, such as the Emergency Call Session Control Function (E-CSCF), to process the emergency call. Here, the E-CSCF and/or other functions implemented by the EPC/IMS 1006 can utilize the NSI parameters provided by the RAN 1004 in order to identify a specific PSAP 1008 to which to route the call. The EPC/IMS 1006 can then route the call to the identified PSAP 1008 at time 1050 together with the NSI parameters received via the UE 1002. Subsequently, the PSAP 1008 can receive the call as an NSI emergency call with NSI parameters that include details regarding the calling party, such as location data, callback number and/or MSISDN, or other suitable subscriber information, in order to improve handling of the emergency call at the PSAP 1008.

Figure 11:
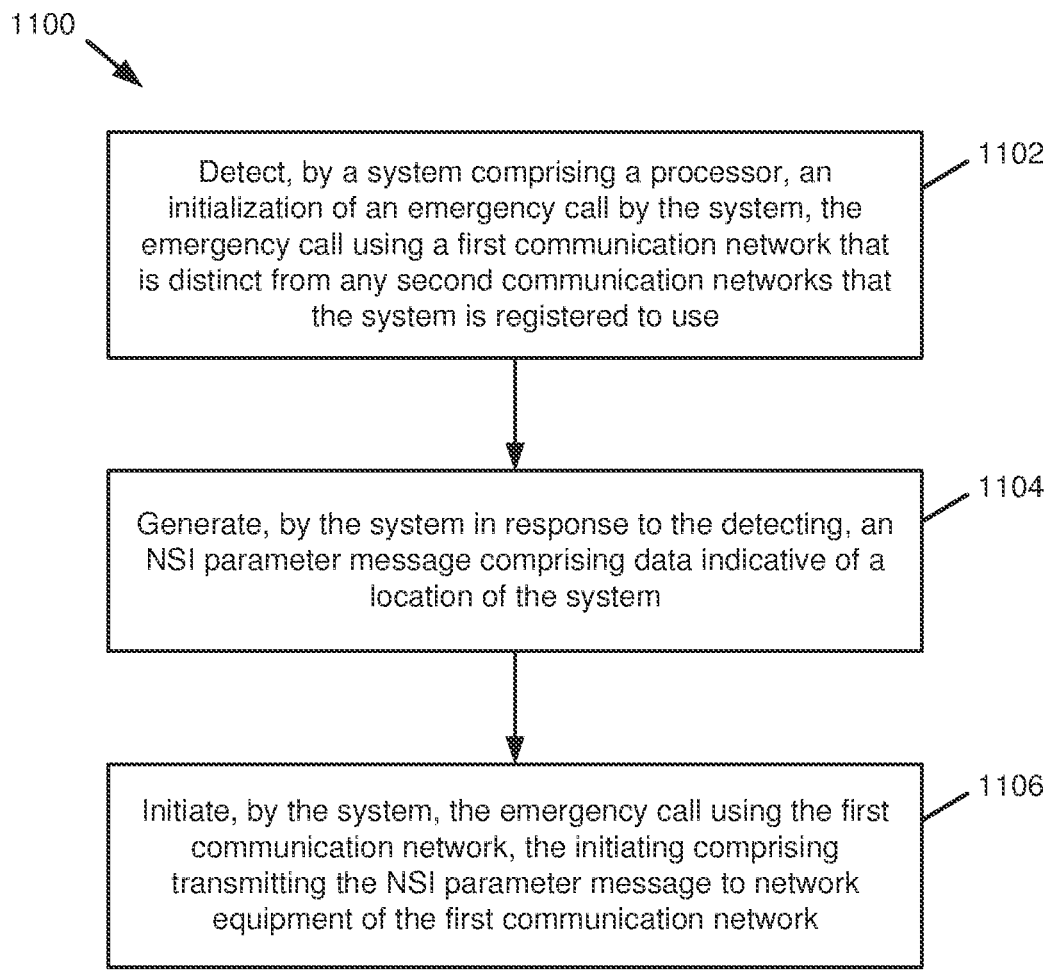
FIG. 11 is a flow diagram of a method that facilitates NSI emergency call device parameters in accordance with various aspects described herein.

With reference now to FIG. 11, a flow diagram of a method 1100 that facilitates NSI emergency call device parameters is presented. At 1102, a system comprising a processor (e.g., network equipment 10 comprising a processor 14, and/or a system including such a device) can detect (e.g., by a session initiation component 210 and/or other components implemented by the processor 14) an initialization of an emergency call by the system. Further at 1102, the system can determine that the emergency call is an NSI call, e.g., based on the emergency call using a first communication network (e.g., a communication network 20) that is distinct from any second communication networks that the system is registered to use (e.g., a home network and/or roaming networks).

At 1104, the system can generate (e.g., by an NSI message generation component 220 and/or other components implemented by the processor 14) an NSI parameter message that includes data indicative of a location of the system. The message generated at 1104 can also include additional information, such as a subscriber name or address, a MSISDN associated with the system, or other appropriate data.

At 1106, the system can initiate (e.g., by an emergency call component 230 and/or other components implemented by the processor 14) the emergency call using the first communication network identified at 1102. Additionally, initiating the emergency call at 1106 can include transmitting the NSI parameter message generated at 1104 to network equipment (e.g., RAN equipment) of the first communication network.

FIG. 11 illustrates a method in accordance with certain aspects of this disclosure. While, for purposes of simplicity of explanation, the method is shown and described as a series of acts, it is noted that this disclosure is not limited by the order of acts, as some acts may occur in different orders and/or concurrently with other acts from that shown and described herein. For example, those skilled in the art will understand and appreciate that methods can alternatively be represented as a series of interrelated states or events, such as in a state diagram. Moreover, not all illustrated acts may be required to implement methods in accordance with certain aspects of this disclosure.

Figure 12:
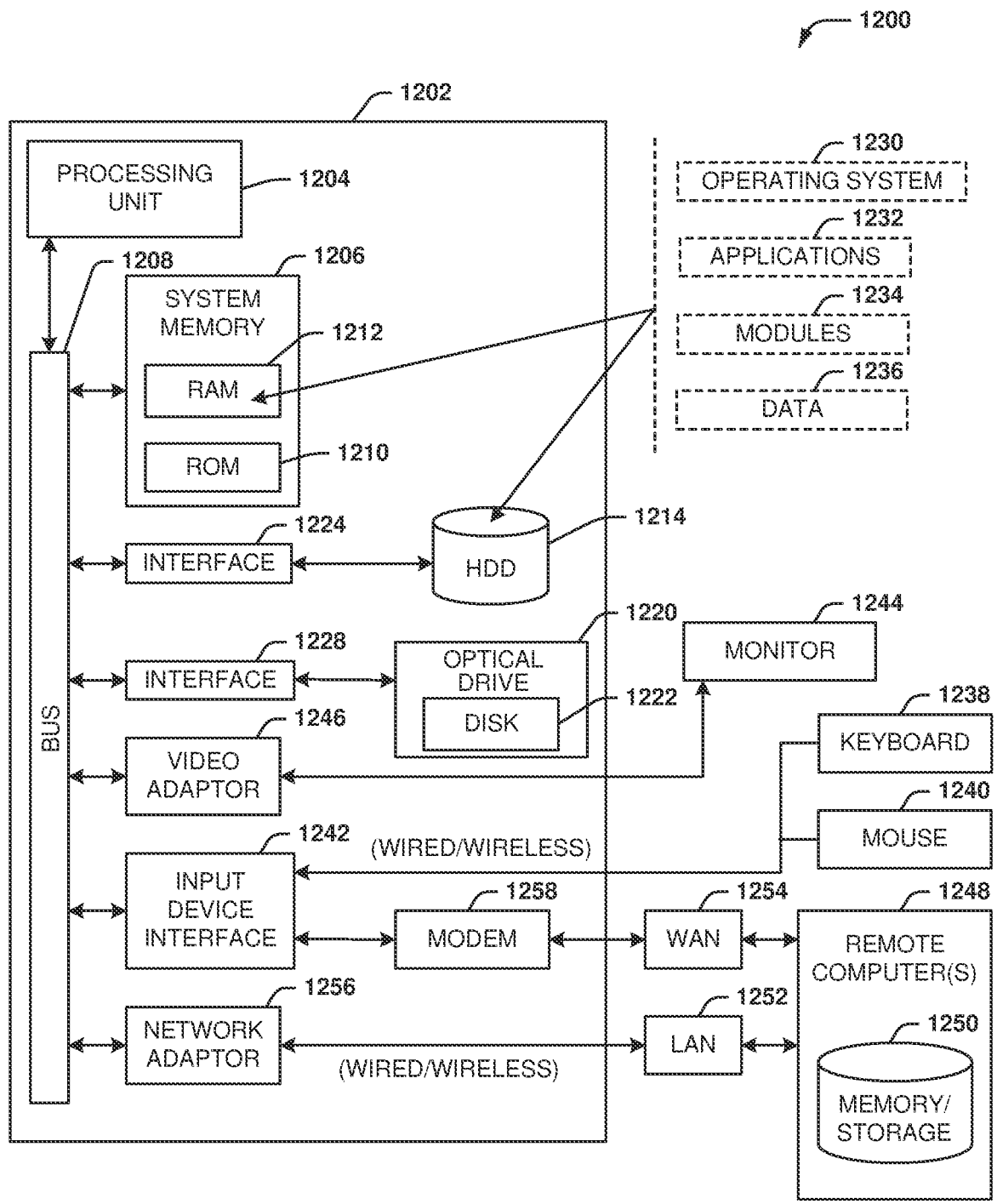
FIG. 12 depicts an example computing environment in which various embodiments described herein can function.

In order to provide additional context for various embodiments described herein, FIG. 12 and the following discussion are intended to provide a brief, general description of a suitable computing environment 1200 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media and/or communications media, which two terms are used herein differently from one another as follows. Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 12, the example environment 1200 for implementing various embodiments of the aspects described herein includes a computer 1202, the computer 1202 including a processing unit 1204, a system memory 1206 and a system bus 1208. The system bus 1208 couples system components including, but not limited to, the system memory 1206 to the processing unit 1204. The processing unit 1204 can be any of various commercially available processors. Dual microprocessors and other multi-processor architectures can also be employed as the processing unit 1204.

The system bus 1208 can be any of several types of bus structure that can further interconnect to a memory bus (with or without a memory controller), a peripheral bus, and a local bus using any of a variety of commercially available bus architectures. The system memory 1206 includes ROM 1210 and RAM 1212. A basic input/output system (BIOS) can be stored in a non-volatile memory such as ROM, erasable programmable read only memory (EPROM), EEPROM, which BIOS contains the basic routines that help to transfer information between elements within the computer 1202, such as during startup. The RAM 1212 can also include a high-speed RAM such as static RAM for caching data.

The computer 1202 further includes an internal hard disk drive (HDD) 1214 and an optical disk drive 1220, (e.g., which can read or write from a CD-ROM disc, a DVD, a BD, etc.). While the internal HDD 1214 is illustrated as located within the computer 1202, the internal HDD 1214 can also be configured for external use in a suitable chassis (not shown). Additionally, while not shown in environment 1200, a solid state drive (SSD) could be used in addition to, or in place of, an HDD 1214. The HDD 1214 and optical disk drive 1220 can be connected to the system bus 1208 by an HDD interface 1224 and an optical drive interface 1228, respectively. The HDD interface 1224 can additionally support external drive implementations via Universal Serial Bus (USB), Institute of Electrical and Electronics Engineers (IEEE) 1394, and/or other interface technologies. Other external drive connection technologies are within contemplation of the embodiments described herein.

The drives and their associated computer-readable storage media provide nonvolatile storage of data, data structures, computer-executable instructions, and so forth. For the computer 1202, the drives and storage media accommodate the storage of any data in a suitable digital format. Although the description of computer-readable storage media above refers to respective types of storage devices, it is noted by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1212, including an operating system 1230, one or more application programs 1232, other program modules 1234 and program data 1236. All or portions of the operating system, applications, modules, and/or data can also be cached in the RAM 1212. The systems and methods described herein can be implemented utilizing various commercially available operating systems or combinations of operating systems.

A user can enter commands and information into the computer 1202 through one or more wired/wireless input devices, e.g., a keyboard 1238 and a pointing device, such as a mouse 1240. Other input devices (not shown) can include a microphone, an infrared (IR) remote control, a joystick, a game pad, a stylus pen, touch screen or the like. These and other input devices are often connected to the processing unit 1204 through an input device interface 1242 that can be coupled to the system bus 1208, but can be connected by other interfaces, such as a parallel port, an IEEE 1394 serial port, a game port, a USB port, an IR interface, a BLUETOOTH® interface, etc.

A monitor 1244 or other type of display device can be also connected to the system bus 1208 via an interface, such as a video adapter 1246. In addition to the monitor 1244, a computer typically includes other peripheral output devices (not shown), such as speakers, printers, etc.

The computer 1202 can operate in a networked environment using logical connections via wired and/or wireless communications to one or more remote computers, such as a remote computer(s) 1248. The remote computer(s) 1248 can be a workstation, a server computer, a router, a personal computer, portable computer, microprocessor-based entertainment appliance, a peer device or other common network node, and typically includes many or all of the elements described relative to the computer 1202, although, for purposes of brevity, only a memory/storage device 1250 is illustrated. The logical connections depicted include wired/wireless connectivity to a local area network (LAN) 1252 and/or larger networks, e.g., a wide area network (WAN) 1254. Such LAN and WAN networking environments are commonplace in offices and companies, and facilitate enterprise-wide computer networks, such as intranets, all of which can connect to a global communications network, e.g., the Internet.

When used in a LAN networking environment, the computer 1202 can be connected to the local network 1252 through a wired and/or wireless communication network interface or adapter 1256. The adapter 1256 can facilitate wired or wireless communication to the LAN 1252, which can also include a wireless access point (AP) disposed thereon for communicating with the wireless adapter 1256.

When used in a WAN networking environment, the computer 1202 can include a modem 1258 or can be connected to a communications server on the WAN 1254 or has other means for establishing communications over the WAN 1254, such as by way of the Internet. The modem 1258, which can be internal or external and a wired or wireless device, can be connected to the system bus 1208 via the input device interface 1242. In a networked environment, program modules depicted relative to the computer 1202 or portions thereof, can be stored in the remote memory/storage device 1250. It will be appreciated that the network connections shown are example and other means of establishing a communications link between the computers can be used.

The computer 1202 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can include Wireless Fidelity (Wi-Fi) and BLUETOOTH® wireless technologies. Thus, the communication can be a predefined structure as with a conventional network or simply an ad hoc communication between at least two devices.

The above description includes non-limiting examples of the various embodiments. It is, of course, not possible to describe every conceivable combination of components or methodologies for purposes of describing the disclosed subject matter, and one skilled in the art may recognize that further combinations and permutations of the various embodiments are possible. The disclosed subject matter is intended to embrace all such alterations, modifications, and variations that fall within the spirit and scope of the appended claims.

With regard to the various functions performed by the above described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature may be combined with one or more other features of the other implementations as may be desired and advantageous for any given or particular application.

The terms "exemplary" and/or "demonstrative" as used herein are intended to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:
    detecting, by a system comprising a processor of a communication device, an initialization of an emergency call by the communication device, the emergency call using a roaming communication network that is distinct from a home communication network that the communication device is registered to use, wherein the roaming communication network is managed by a first network operator, wherein the home communication network is managed by a second network operator, wherein there is no service agreement between the first network operator and the second network operator, thereby preventing the communication device from registering with the roaming communication network;
    generating, by the system in response to the detecting, a non-service initiated parameter message comprising data indicative of a location of the communication device, the location being based on Global Positioning System (GPS) coordinates derived by the communication device; and
    initiating, by the system, the emergency call using the roaming communication network, the initiating comprising transmitting the non-service initiated parameter message including the GPS coordinates to network equipment of the roaming communication network, wherein the non-service initiated parameter message enables the roaming communication network to accept the emergency call even with no service agreement between the first network operator and the second network operator.

2. The method of claim 1, wherein the generating of the non-service initiated parameter message comprises populating the non-service initiated parameter message with subscriber profile parameters associated with the communication device, and wherein the emergency call using the roaming communication network that is distinct from any the home communication network that the communication device is registered to use is based on identifying the home network of the communication device and identifying one or more roaming networks with which the home network has a roaming agreement.

3. The method of claim 2, further comprising:
    in response to determining that a universal integrated circuit card is associated with the communication device, retrieving, by the system, the subscriber profile parameters from the universal integrated circuit card.

4. The method of claim 2, further comprising:
    in response to determining that a universal integrated circuit card is not associated with the communication device, retrieving, by the system, the subscriber profile parameters from a cache associated with the communication device.

5. The method of claim 2, wherein the subscriber profile parameters comprise a parameter selected from a group of parameters comprising a mobile station international subscriber directory number, a telephone number, and a registered subscriber location.

6. The method of claim 1, further comprising:
    determining, by the system, the location of the communication device using a position location system associated with the communication device.

7. The method of claim 6, wherein the determining of the location of the communication device is in response to determining that a universal integrated circuit card is not associated with the communication device.

8. The method of claim 1, further comprising:
    selecting, by the system, the roaming communication network based on signal strength measurements; and
    processing, by the system, the initialization of the emergency call using the roaming communication network in response to determining that communication service is not available via any of the home communication network.

9. The method of claim 1, wherein the communication device is a smartphone, a tablet, an InternetOfThings device, or a vehicle communication system.

10. A system operating in a communication device, comprising:
    a processor; and a memory that stores executable instructions that, when executed by the processor, facilitate performance of operations, comprising:

processing an initialization of an emergency call using resources enabled via a roaming communication network that is distinct from a home communication network with which the communication device is registered wherein the roaming communication network is managed by a first network operator, wherein the home communication network is managed by a second network operator, wherein there is no service agreement between the first network operator and the second network operator, thereby preventing the communication device from registering with the roaming communication network;

in response to the processing, generating a non-service initiated data message, the non-service initiated data message comprising location data associated with a position of the communication device, the location data being based on Global Positioning System (GPS) coordinates derived by the communication device; and initiating the emergency call via the roaming communication network, comprising transmitting the non-service initiated data message to network equipment of the roaming communication network, wherein the non-service initiated data message enables the roaming communication network to accept the emergency call even with no service agreement between the first network operator and the second network operator.

11. The system of claim 10, wherein the operations further comprise:

prior to the initiating of the emergency call, populating the non-service initiated data message with subscriber profile data associated with the communication device.

12. The system of claim 11, wherein the communication device further comprises a universal integrated circuit card, and wherein the operations further comprise:

retrieving the subscriber profile data from the universal integrated circuit card.

13. The system of claim 11, wherein the operations further comprise:

in response to determining that a universal integrated circuit card is not associated with the communication device, retrieving the subscriber profile data from a cache maintained by the communication device.

14. The system of claim 11, wherein the subscriber profile data comprise a parameter selected from a group of parameters comprising a mobile station international subscriber directory number, a telephone number, and a registered subscriber location.

15. The system of claim 10, wherein the processing of the initialization of the emergency call is in response to determining that communication service is not available via the home communication network.

16. A non-transitory machine-readable medium, comprising executable instructions that, when executed by a processor of a communication device, facilitate performance of operations, comprising:

detecting a request for a non-service initiated emergency call, the non-service initiated emergency call using resources associated with a roaming communication network that is distinct from a home communication network to which the communication device is registered wherein the roaming communication network is managed by a first network operator, wherein the home communication network is managed by a second network operator, wherein there is no service agreement between the first network operator and the second network operator, thereby preventing the communication device from registering with the roaming communication network;

in response to the processing, generating a non-service initiated parameter message, the non-service initiated parameter message comprising data associated with a location of the communication device, the location being based on Global Positioning System (GPS) coordinates derived by the communication device; and initiating the non-service initiated emergency call with the roaming communication network, comprising transmitting the non-service initiated parameter message to radio access network equipment of the roaming communication network, wherein the non-service initiated data message enables the roaming communication network to accept the emergency call even with no service agreement between the first network operator and the second network operator.

17. The non-transitory machine-readable medium of claim 16, wherein the generating of the non-service initiated parameter message comprises populating the non-service initiated parameter message with subscriber profile data associated with the communication device.

18. The non-transitory machine-readable medium of claim 17, wherein the operations further comprise:

in response to determining that a subscriber information module is associated with the communication device, retrieving the subscriber profile data from the subscriber information module.

19. The non-transitory machine-readable medium of claim 17, wherein the operations further comprise:

in response to determining that a subscriber information module is not associated with the communication device, retrieving the subscriber profile data from a storage medium associated with the communication device.

20. The non-transitory machine-readable medium of claim 17, wherein the subscriber profile data comprises a parameter selected from a group of parameters comprising a mobile station international subscriber directory number, a telephone number, and a registered subscriber location.

* * * * *

UNITED STATES PATENT AND TRADEMARK OFFICE
CERTIFICATE OF CORRECTION

| | | |
|---|---|---|
| PATENT NO. | : 12,452,955 B2 | Page 1 of 1 |
| APPLICATION NO. | : 17/806825 | |
| DATED | : October 21, 2025 | |
| INVENTOR(S) | : Sreejith Menon and Suja John | |

It is certified that error appears in the above-identified patent and that said Letters Patent is hereby corrected as shown below:

In the Claims

In Column 14, Line 23, remove the word "any" in Claim 2.

Signed and Sealed this
Eighteenth Day of November, 2025

John A. Squires
*Director of the United States Patent and Trademark Office*